(12) United States Patent
Saab et al.

(10) Patent No.: US 12,395,213 B2
(45) Date of Patent: Aug. 19, 2025

(54) CIRCULAR ANTENNA ARRAY DESIGN FOR FUTURE 6G TBPS WIRELESS COMMUNICATIONS

(71) Applicant: Samsung Electronics Co., Ltd., Suwon-si (KR)

(72) Inventors: Sandy Saab, Plano, TX (US); Jorge Luis Gomez Ponce, Los Angeles, CA (US); Shadi Abu-Surra, Plano, TX (US); Gang Xu, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 4 days.

(21) Appl. No.: 18/364,424

(22) Filed: Aug. 2, 2023

(65) Prior Publication Data

US 2024/0056145 A1   Feb. 15, 2024

Related U.S. Application Data

(60) Provisional application No. 63/397,192, filed on Aug. 11, 2022.

(51) Int. Cl.
*H04B 7/06* (2006.01)
*H04B 7/0426* (2017.01)

(52) U.S. Cl.
CPC ......... *H04B 7/0608* (2013.01); *H04B 7/0447* (2013.01); *H04B 7/0634* (2013.01)

(58) Field of Classification Search
CPC .. H04B 7/0602; H04B 7/0608; H04B 7/0686; H04B 7/0961; H04B 7/0447;
(Continued)

(56) References Cited

U.S. PATENT DOCUMENTS 8,396,153 B1 * 3/2013 Shen ............... H04L 1/0625
                                                    370/464
9,503,258 B2 * 11/2016 Ashrafi .............. H04J 14/06
(Continued)

FOREIGN PATENT DOCUMENTS

CN          114520682 A     5/2022
JP            7005009 B2    1/2022
(Continued)

OTHER PUBLICATIONS

Balanis, C.A., "Antenna Theory: Analysis and Design", Third Edition, John Wiley & Sons, Inc., 2005, 1073 pages.
(Continued)

*Primary Examiner* — James M Perez

(57) ABSTRACT

Configuration of a line of sight, multiple input, multiple output circular antenna array involves setting an integer number of antenna arrays up to a number of antenna ports for the circular antenna array and a maximum radius for any antenna ring within the circular antenna array. A capacity is determined for each of a plurality of different combinations of each of: an integer number of antenna rings up to a predetermined maximum number of antenna rings, a number of the antenna arrays for each of the number of antenna rings, and angular offsets for that antenna arrays on each of the antenna rings. The determined capacities for the plurality of different combinations are compared.

20 Claims, 12 Drawing Sheets

(58) Field of Classification Search
CPC .......................... H04B 7/0634; H04B 7/0695;
H04B 7/06952; H04B 7/06956; H04B
7/0413; H04B 7/0426; H04B 7/0434
See application file for complete search history.

(56) References Cited

U.S. PATENT DOCUMENTS

| | | | | |
|---|---|---|---|---|
| 9,595,766 | B2* | 3/2017 | Ashrafi | H01Q 15/0033 |
| 9,645,083 | B2* | 5/2017 | Ashrafi | G01N 33/4833 |
| 9,935,698 | B1* | 4/2018 | Yang | H04B 7/0469 |
| 9,973,943 | B2* | 5/2018 | Lysejko | H01Q 3/02 |
| 10,070,325 | B2* | 9/2018 | Logothetis | H04W 16/28 |
| 10,425,140 | B2* | 9/2019 | Kim | H04B 7/0691 |
| 11,177,990 | B1* | 11/2021 | Gil | H01Q 21/20 |
| 11,258,186 | B2* | 2/2022 | Kim | H01Q 9/0414 |
| 11,258,187 | B2* | 2/2022 | Tehran | H01Q 9/0407 |
| 11,296,428 | B2* | 4/2022 | Moon | H01Q 9/0407 |
| 11,451,270 | B2* | 9/2022 | Abu-Surra | H04B 7/0413 |
| 11,569,575 | B2* | 1/2023 | Klemmer | H04B 7/0617 |
| 11,762,051 | B2* | 9/2023 | Moon | H04B 7/088 |
| | | | | 342/359 |
| 11,799,213 | B2* | 10/2023 | Moon | H04B 7/0691 |
| 11,894,889 | B2* | 2/2024 | Zhang | H04B 7/0695 |
| 11,984,659 | B2* | 5/2024 | Zhang | H01Q 21/29 |
| 11,984,961 | B2* | 5/2024 | Zhu | H04B 7/0617 |
| 2012/0275426 | A1* | 11/2012 | Suzuki | H04B 7/0617 |
| | | | | 370/329 |
| 2012/0281783 | A1* | 11/2012 | Cheng | H04B 7/0456 |
| | | | | 375/295 |
| 2012/0314570 | A1* | 12/2012 | Forenza | H04W 72/541 |
| | | | | 370/252 |
| 2013/0142136 | A1* | 6/2013 | Pi | H04B 7/15507 |
| | | | | 370/329 |
| 2014/0328423 | A1* | 11/2014 | Agee | H04W 52/42 |
| | | | | 375/267 |
| 2014/0334565 | A1* | 11/2014 | Tzanidis | H01Q 21/062 |
| | | | | 375/267 |
| 2015/0357709 | A1* | 12/2015 | Kim | H01Q 21/065 |
| | | | | 342/371 |
| 2016/0254897 | A1* | 9/2016 | Berretta | H04L 5/02 |
| | | | | 375/267 |
| 2016/0372836 | A1* | 12/2016 | Ashrafi | H01Q 15/16 |
| 2016/0380363 | A1* | 12/2016 | Logothetis | H04W 72/23 |
| | | | | 343/853 |
| 2016/0381591 | A1* | 12/2016 | Lysejko | H01Q 21/00 |
| | | | | 370/252 |
| 2017/0062910 | A1* | 3/2017 | Iida | H04B 5/72 |
| 2017/0117626 | A1* | 4/2017 | Sajuyigbe | H01Q 1/523 |
| 2017/0126459 | A1* | 5/2017 | Dutronc | H04L 27/2659 |
| 2017/0343750 | A1* | 11/2017 | Ashrafi | H04J 14/07 |
| 2020/0382198 | A1* | 12/2020 | Ashrafi | H04B 7/155 |
| 2020/0395680 | A1* | 12/2020 | Kim | H01Q 9/045 |
| 2020/0412018 | A1* | 12/2020 | Tehran | H01Q 9/0407 |
| 2021/0111781 | A1* | 4/2021 | Sasaki | H04J 14/07 |
| 2022/0029690 | A1* | 1/2022 | Alavi | H01Q 3/34 |
| 2022/0038142 | A1* | 2/2022 | Abu-Surra | H01Q 1/2283 |
| 2022/0078780 | A1* | 3/2022 | Choi | H04B 7/0456 |
| 2022/0116244 | A1* | 4/2022 | Kamiya | H04L 25/0202 |
| 2022/0190885 | A1* | 6/2022 | Nakayama | H04B 7/06 |
| 2022/0393753 | A1* | 12/2022 | Nakayama | H04B 7/0617 |
| 2022/0416417 | A1* | 12/2022 | Zhang | H01Q 3/2605 |
| 2022/0416848 | A1* | 12/2022 | Zhang | H01Q 3/36 |
| 2023/0035971 | A1* | 2/2023 | Girnyk | G06N 3/08 |
| 2023/0275623 | A1* | 8/2023 | Kim | H04B 7/043 |
| 2023/0344506 | A1* | 10/2023 | Saab | H04B 7/145 |
| 2023/0395994 | A1* | 12/2023 | Zhang | H01Q 21/205 |
| 2023/0421214 | A1* | 12/2023 | Mengnan | H04B 7/0469 |
| 2024/0014550 | A1* | 1/2024 | Zhang | H04W 28/0215 |
| 2024/0048192 | A1* | 2/2024 | Saab | H04B 7/0617 |
| 2024/0056145 | A1* | 2/2024 | Saab | H04B 7/0691 |
| 2024/0088990 | A1* | 3/2024 | Zhang | H04W 4/08 |
| 2024/0258695 | A1* | 8/2024 | Leung | H01Q 21/28 |
| 2024/0258701 | A1* | 8/2024 | Dave | H01Q 9/045 |
| 2024/0305355 | A1* | 9/2024 | Zhang | H04L 27/2601 |

FOREIGN PATENT DOCUMENTS

| | | |
|---|---|---|
| KR | 101718282 B1 | 3/2017 |
| KR | 101971801 B1 | 4/2019 |

OTHER PUBLICATIONS

Jeon, Y., et al., "Design and Analysis of LoS MIMO Systems with Uniform Circular Arrays", IEEE Transactions on Wireless Communications, vol. 20, No. 7, Jul. 2021, 13 pages.

Goldsmith, A., "Wireless Communications", Cambridge University Press, 2005, 673 pages.

Shannon, C.E., "A Mathematical Theory of Communication", The Bell System Technical Journal, vol. 27, No. 3, Jul. 1948, 55 pages.

* cited by examiner

CIRCULAR ANTENNA ARRAY DESIGN FOR FUTURE 6G TBPS WIRELESS COMMUNICATIONS

CROSS-REFERENCE TO RELATED APPLICATION AND CLAIM OF PRIORITY

This application claims priority under 35 U.S.C. § 119(e) to U.S. Provisional Patent Application No. 63/397,192 filed Aug. 11, 2022. The content of the above-identified patent document(s) is incorporated herein by reference.

TECHNICAL FIELD

The present disclosure relates generally to circular antenna arrays and, more specifically, to optimizing a circular antenna array configuration.

BACKGROUND

To meet the demand for wireless data traffic having increased since deployment of 4G communication systems and to enable various vertical applications, 6G/5G/NR communication systems have been developed and are currently being deployed. The 6G/5G/NR communication system is considered to be implemented in higher frequency (mm Wave) bands, e.g., 28 giga-Hertz (GHz) or 60 GHz bands, so as to accomplish higher data rates or in lower frequency bands, such as 6 GHz, to enable robust coverage and mobility support. To decrease propagation loss of the radio waves and increase the transmission distance, the beam-forming, massive multiple-input multiple-output (MIMO), full dimensional MIMO (FD-MIMO), array antenna, an analog beam forming, large scale antenna techniques are discussed in 5G/NR communication systems.

In addition, in 6G/5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 6G and 5G systems and frequency bands associated therewith is for reference as certain embodiments of the present disclosure may be implemented in 6G/5G systems. However, the present disclosure is not limited to 6G/5G systems or the frequency bands associated therewith, and embodiments of the present disclosure may be utilized in connection with any frequency band. For example, aspects of the present disclosure may also be applied to deployment of 6G/5G communication systems, 6G or even later releases which may use terahertz (THz) bands.

SUMMARY

Configuration of a line of sight, multiple input, multiple output circular antenna array involves setting an integer number of antenna arrays up to a number of antenna ports for the circular antenna array and a maximum radius for any antenna ring within the circular antenna array. A capacity is determined for each of a plurality of different combinations of each of: an integer number of antenna rings up to a predetermined maximum number of antenna rings, a number of the antenna arrays for each of the number of antenna rings, and angular offsets for that antenna arrays on each of the antenna rings. The determined capacities for the plurality of different combinations are compared.

In a first embodiment, a method for configuration of a line of sight, multiple input, multiple output circular antenna array includes setting an integer number of antenna arrays up to a number of antenna ports for the circular antenna array and a maximum radius for any antenna ring within the circular antenna array. The method further includes determining a capacity for each of a plurality of different combinations of each of: an integer number of antenna rings up to a predetermined maximum number of antenna rings; a number of the antenna arrays for each of the number of antenna rings; and angular offsets for that antenna arrays on each of the antenna rings. The method also includes comparing the determined capacities for the plurality of different combinations.

In a second embodiment, an apparatus for configuration of a line of sight, multiple input, multiple output circular antenna array includes a processor. The process is configured to set an integer number of antenna arrays up to a number of antenna ports for the circular antenna array and a maximum radius for any antenna ring within the circular antenna array. The processor is further configured to determine a capacity for each of a plurality of different combinations of each of: an integer number of antenna rings up to a predetermined maximum number of antenna rings; a number of the antenna arrays for each of the number of antenna rings; and angular offsets for that antenna arrays on each of the antenna rings. The processor is also configured to compare the determined capacities for the plurality of different combinations.

In any of the preceding embodiments, the plurality of different combinations may include at least one uniform circular array configuration, at least one uniform concentric circular array configuration, and at least one non-uniform concentric circular array configuration.

In any of the preceding embodiments, the capacity for each of the plurality of different combinations may be determined for a specified signal-to-noise ratio and a specified area.

In any of the preceding embodiments, the capacity for each of the plurality of different combinations may be determined for a specified carrier frequency and a specified distance between a transmitter and a receiver using the antenna ports.

In any of the preceding embodiments, the capacity for each of the plurality of different combinations may be determined for a same circular antenna array configuration used by both a transmitter and a receiver.

In any of the preceding embodiments, the plurality of different combinations may each correspond to a circulant channel matrix.

In any of the preceding embodiments, the capacity for each of the plurality of different combinations may be determined based on equal power being allocated to all ports for the antenna arrays.

In any of the preceding embodiments, the antenna arrays may be selected to be non-overlapping.

In any of the preceding embodiments, the capacity for each of the plurality of different combinations may be determined for an antenna subarray selection between two specific base stations.

In any of the preceding embodiments, the capacity for each of the plurality of different combinations may be determined for antenna rings at a transmitter and at a receiver are at a same radius.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. Likewise, the term "set" means one or more. Accordingly, a set of items can be a single item or a collection of two or more items.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

Figure 1:
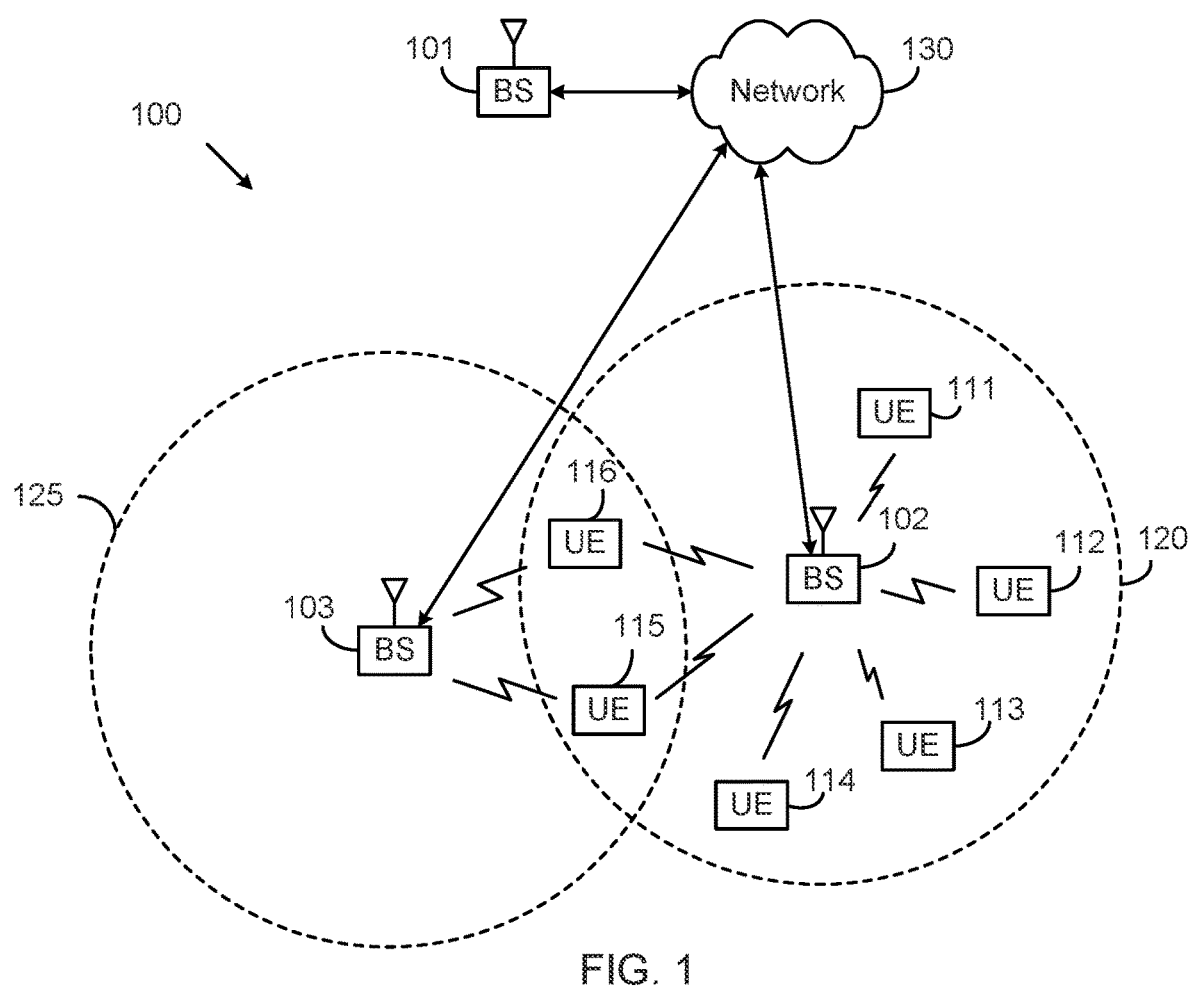
FIG. 1 illustrates an exemplary networked system utilizing circular antenna arrays designed according to various embodiments of this disclosure.

The figures included herein, and the various embodiments used to describe the principles of the present disclosure are by way of illustration only and should not be construed in any way to limit the scope of the disclosure. Further, those skilled in the art will understand that the principles of the present disclosure may be implemented in any suitably arranged wireless communication system.

References

[1] Balanis, C. A. Antenna Theory: Analysis and Design (New Jersey, John Wiley and Sons, 2005).

[2] Jeon, G. -T. Gil and Y. H. Lee, "Design and Analysis of LoS-MIMO Systems With Uniform Circular Arrays," in IEEE Transactions on Wireless Communications, vol. 20, no. 7, pp. 4527-4540, July 2021, doi: 10.1109/TWC.2021.3060021.

[3] L. Zhou and Y. Ohashi, "Low complexity millimeter-wave LOS-MIMO precoding systems for uniform circular arrays," 2014 IEEE Wireless Communications and Networking Conference (WCNC), 2014, pp 1293-1297, doi: 10.1109/WCNC.2014.6952356.

[4] L. Zhou and Y. Ohashi, "Performance Analysis of mm Wave LOS-MIMO Systems with Uniform Circular Arrays," 2015 IEEE 81st Vehicular Technology Conference (VTC Spring), 2015, pp. 1-5, doi: 10.1109/VTCSpring.2015.7146001.

[5] M. Palaiologos, M. H. C. Garcia, R. A. Stirling-Gallacher and G. Caire, "Design of Robust LoS MIMO Systems with UCAs," 2021 IEEE 94th Vehicular Technology Conference (VTC2021-Fall), 2021, pp. 1-5, doi: 10.1109/VTC2021-Fall52928.2021.9625511.

[6] R. Chen, W. -X. Long and J. Li, "Reception of Misaligned Multi-Mode OAM Signals," 2019 IEEE Global Communications Conference (GLOBECOM), 2019, pp. 1-5.

[7] Andreas F. Molisch. 2011. Wireless Communications (2nd. ed.). Wiley Publishing.

[8] A. Goldsmith, Wireless Communications. Cambridge: Cambridge University Press, 2005.

[9] C. E. Shannon, "A mathematical theory of communication," in The Bell System Technical Journal, vol. 27, no. 3, pp. 379-423, July 1948, doi: 10.1002/j.1538-7305.1948.tb01338.x.

[10] J. Winters, "On the Capacity of Radio Communication Systems with Diversity in a Rayleigh Fading Environment," in IEEE Journal on Selected Areas in Communications, vol. 5, no. 5, pp. 871-878, June 1987, doi: 10.1109/JSAC.1987.1146600.

[11] Foschini, G., Gans, M. On Limits of Wireless Communications in a Fading Environment when Using Multiple Antennas. Wireless Personal Communications 6, 311-335 (1998). https://doi.org/10.1023/A:1008889222784.

[12] W. Zhang et al., "Mode Division Multiplexing Communication Using Microwave Orbital Angular Momentum: An Experimental Study," in IEEE Transactions on Wireless Communications, vol. 16, no. 2, pp. 1308-1318, February 2017, doi: 10.1109/TWC.2016.2645199.

[13] H. Cho, C. Park and N. Lee, "Capacity-Achieving Precoding with Low-Complexity for Terahertz LOS Massive MIMO using Uniform Planar Arrays," 2020 International Conference on Information and Communication Technology Convergence (ICTC), 2020, pp. 535-539.

[14] M. Palaiologos, M. H. C. Garcia, R. A. Stirling-Gallacher and G. Caire, "Design of Robust LoS MIMO Systems with UCAs," 2021 IEEE 94th Vehicular Technology Conference (VTC2021-Fall), 2021, pp. 1-5, doi: 10.1109/VTC2021-Fall52928.2021.9625511.

[15] P. Larsson, "Lattice array receiver and sender for spatially orthonormal MIMO communication," 2005 IEEE 61st Vehicular Technology Conference, 2005, pp. 192-196 Vol. 1, doi: 10.1109/VETECS.2005.1543276.

The above-identified reference(s) are incorporated herein by reference.

For future 6G and beyond wireless technologies, achieving peak data rates on the order of tera bits-per-second (Tbps) is very challenging. Accomplishing such speeds requires the design of stable systems with large bandwidths. The need for large bandwidths unlocks the communication at tera-Hertz (THz) frequencies. As a result, the plane wave model assumption can no longer be adopted, but rather the spherical wave model is implemented. At THz, the resulting communication medium is in the antenna's near field and multi-path propagation is very weak as seen by the Fresnel principle [1]. Hence, the line-of-sight (LoS) component becomes dominant. Since the desired data rates are sufficiently high, the use of multiple-input multiple-output (MIMO) systems becomes crucial. As a result, the channel properties at THz frequencies follows that of a LoS MIMO system model.

At THz frequencies, achieving a full rank channel matrix depends on the signal stream orthogonality—that is, the ability to differentiate between each signal. This notion can be preserved when designing the antenna array at the transmitter (TX) and the receiver (RX). Recently, LoS MIMO systems with uniform circular arrays (UCAs) have attracted attention due to the circulant channel matrix property that can be obtained from the use of UCAs. This promotes diagonalization of the channel matrix through the use of a discrete Fourier transform (DFT) precoder and an inverse DFT combiner [2]. The computational complexity of the system is thereby reduced, which motivates the need to find the optimal circular array design at the TX and RX for high speed 6G systems at THz frequencies.

In the present disclosure, three important concepts are introduced and examined: THz communications, near field MIMO, and circular array design. These technologies are incorporated together for potential implications on future backhaul networks and multi-user MIMO systems for 6G communications.

Finding the optimal circular antenna array design for an increased spectral efficiency and reduced computational complex system is very important. Such antenna arrays can be either uniform, non-uniform, concentric, a combination of uniform+concentric, or a combination of non-uniform+concentric. Hence studying which configuration can assist in designing a highly reliable communication system is desirable. Furthermore, to be able to unlock multi-user MIMO communication, having concentric circular arrays can provide the notion of antenna array selection is desirable. This translates to selecting sub antenna arrays to serve several users at the same time. As a result, fixed wireless access as well as multi-user MIMO systems can be supported with antenna array selection. Therefore, the main analysis of the future systems falls on the design of the antenna array being used—which is the main motivation behind this disclosure.

While prior work expressed interest in low complexity precoding systems using UCAs or some performance analysis with UCAs, in the present disclosure the optimal antenna design is sought, without restricting the design to be uniform, but rather finding the optimal structure.

A detailed description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Figure 2:
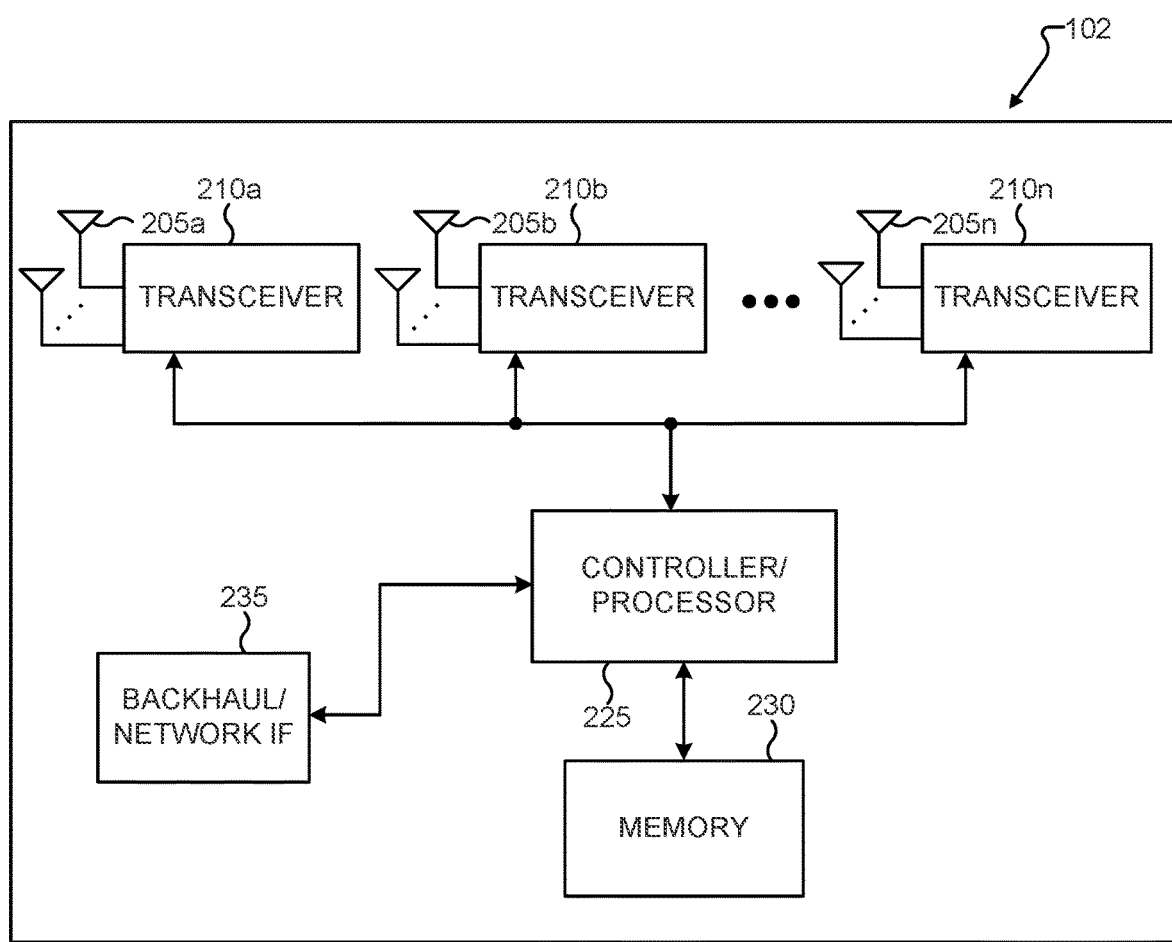
FIG. 2 illustrates an exemplary base station (BS) utilizing circular antenna arrays designed according to various embodiments of this disclosure.
Figure 3:
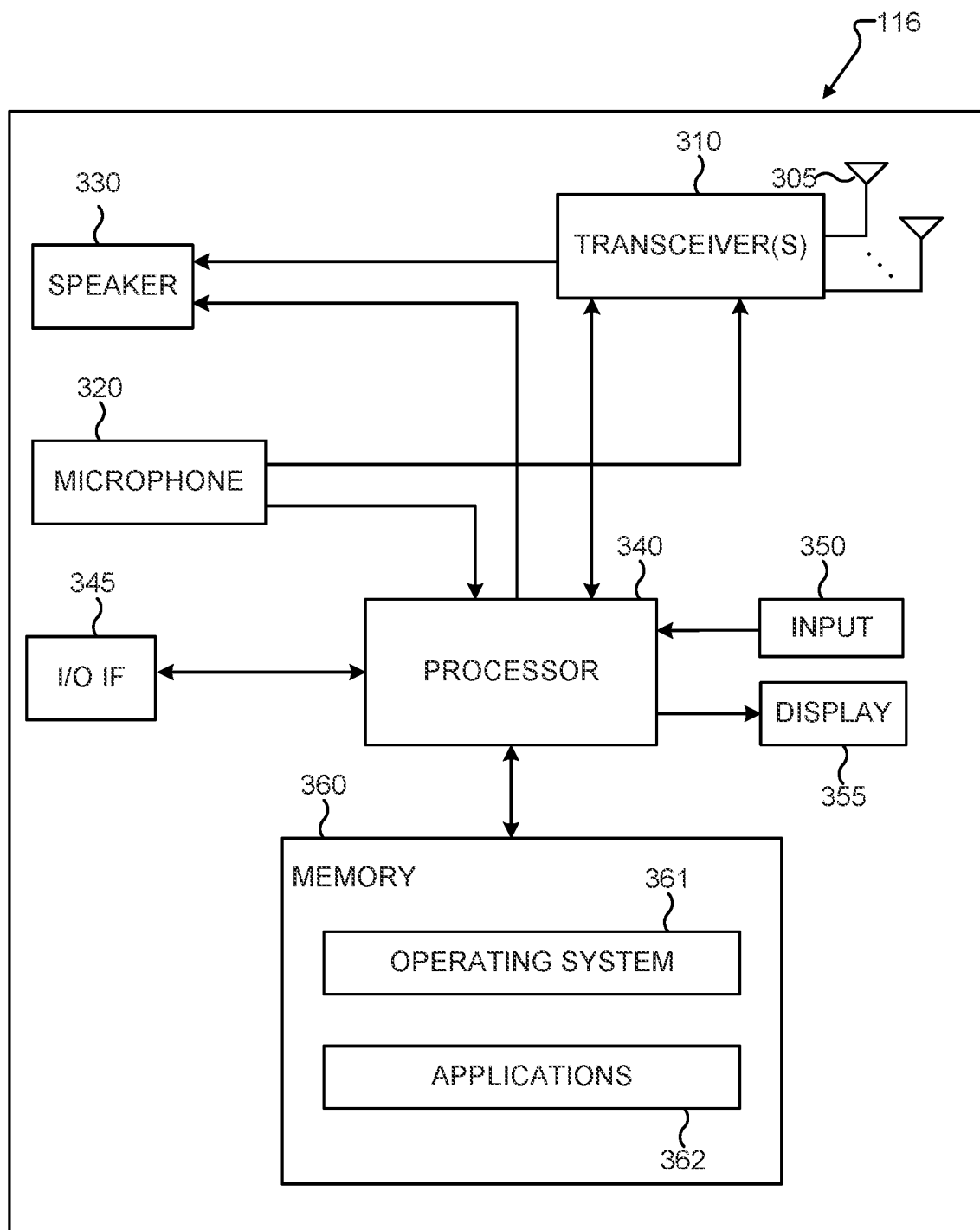
FIG. 3 illustrates an exemplary electronic device for communicating in the networked computing system utilizing circular antenna arrays designed according to various embodiments of this disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an exemplary networked system utilizing circular antenna arrays designed according to various embodiments of this disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103.

The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a Wifi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an exemplary base station (BS) utilizing circular antenna arrays designed according to various embodiments of this disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205*a*-205*n*, multiple transceivers 210*a*-210*n*, a controller/processor 225, a memory 230, and a backhaul or network interface 235.

The transceivers 210*a*-210*n* receive, from the antennas 205*a*-205*n*, incoming RF signals, such as signals transmitted by UEs in the network 100. The transceivers 210*a*-210*n* down-convert the incoming RF signals to generate IF or baseband signals. The IF or baseband signals are processed by receive (RX) processing circuitry in the transceivers 210*a*-210*n* and/or controller/processor 225, which generates processed baseband signals by filtering, decoding, and/or digitizing the baseband or IF signals. The controller/processor 225 may further process the baseband signals.

Transmit (TX) processing circuitry in the transceivers 210*a*-210*n* and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210*a*-210*n* up-converts the baseband or IF signals to RF signals that are transmitted via the antennas 205*a*-205*n*.

The controller/processor 225 can include one or more processors or other processing devices that control the overall operation of the gNB 102. For example, the controller/processor 225 could control the reception of UL channel signals and the transmission of DL channel signals by the transceivers 210*a*-210*n* in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205*a*-205*n* are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an exemplary electronic device for communicating in the networked computing system utilizing circular antenna arrays designed according to various embodiments of this disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives, from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

At THz frequencies, signals suffer from path-loss and attenuation, such that designing energy efficient antenna arrays to accommodate high speed data rates is extremely challenging. Also at THz frequencies, the range between the transmitter and receiver becomes limited. Accordingly, design of a simple system with reduced computational complexity for high order MIMO systems is not a straightforward task, particularly in the presence of area constraints on the array design. This disclosure addresses finding the optimal antenna array design/structure at the TX and RX such that the system has a reduced complexity and also can provide ultra-high data rates.

The present disclosure aims to find the optimal circular antenna array design for LoS MIMO systems at THz frequencies. Using circular arrays can assist in diagonalizing the channel matrix using analog radio frequency (RF) circuitry instead of typical singular value decomposition (SVD) precoders. Furthermore, exhaustive search methods for finding the optimal design in terms of port number, array number and offsets are used. For a flexible overall system, antenna subarray selection at both the TX and RX side is implemented.

As a proof of concept, the present disclosure establishes the design of an optimized circular antenna array assisted with an analog IFFT/FFT precoder to reduce the computational complexity and increase the system's spectral efficiency by use of exhaustive search for finding the optimal circular array design, including finding the number of ports per array, finding the offsets between the ports, and finding the number of arrays per antenna. Design of optimized uniform concentric circular array and non-uniform concentric circular arrays utilizes this exhaustive search method. Antenna subarray selection in the concentric circular arrays is implemented at the TX and RX for improved system flexibility in backhaul networks, multi-user access networks, and/or fixed wireless access.

Figure 4:
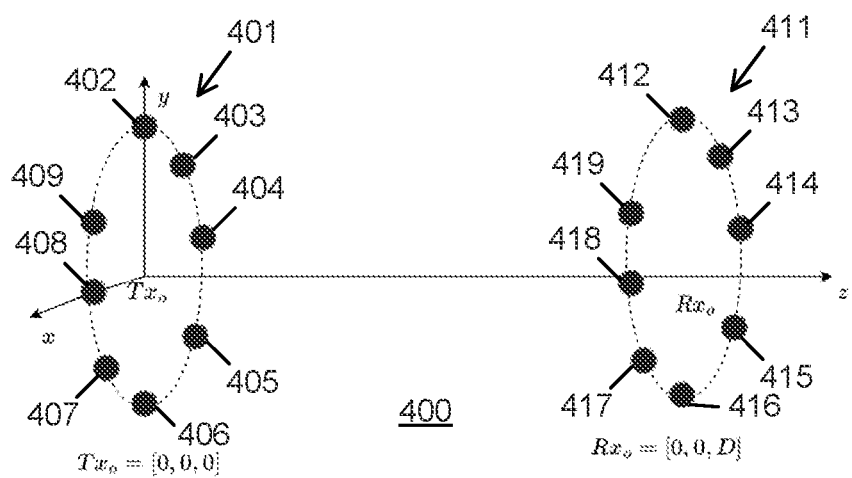
FIG. 4 shows the coordinate system for a UCA channel model implemented for the analysis herein.

FIG. 4 shows the coordinate system for a UCA channel model 400 implemented for the analysis herein. The first step for the design and analysis of the antenna array is to work with the geometry of a uniform circular array. The Tx array 401 is centered in the origin (0=[0 0 0]) and includes M antennas 402, 403, 404, 405, 406, 407, 408, and 409 all at a radius $R_t$ from the origin and uniformly spaced around the origin, with the mth antenna element having an angular offset of $$\theta_m = \frac{2\pi}{M}(m),$$

m∈ (0, . . . , M−1) where M is the number of antennas in the Tx array with the radius $R_t$. The location of the antenna elements is given by [6]:

$$0=[0\ 0\ 0],$$

$$Tx_m=[R_t\cos(\theta_m), R_t\sin(\theta_m), 0]^T. \quad (1)$$

On the opposite side of the link, the Rx array 411 is placed a distance D meters away from the Tx array, at 0=[0 0 D]. The Rx array 410 includes N antennas 412, 413, 414, 415, 416, 417, 418, and 419 all at a radius $R_r$ from the origin and uniformly spaced around the origin, with the nth Rx antenna element having an angular offset $$\theta_n = \frac{2\pi}{N}(n),$$

n∈ (0, . . . , N−1) where N is the number of antennas in the Rx array with radius $R_r$. The location of the antenna elements is given by:

$$Rx_n=[R_r\cos(\theta_n), R_r\sin(\theta_n), 0]^T. \quad (2)$$

An important value for the channel model is the Euclidean distance—antenna spacing—between the mth Tx antenna and the nth Rx antenna, which is computed as follows:

$$d_{m,n}=\sqrt{D_2+R_t^2+R_r^2-2R_tR_r\cos(2\pi(\theta_n-\theta_m-\vartheta_0))}, \quad (3)$$

where $\vartheta_0$ is the difference in angular offset between the Tx and Rx UCAs 401, 411.

With this coordinate system and geometry, the channel model can be described using a Rician channel where the channel matrix H is described as follows [7]:

$$H_{M\times N} = \sqrt{\frac{K}{K+1}} H_{LoS} + \sqrt{\frac{1}{K+1}} H_{NLoS} \quad (4)$$

$$H_{LoS} = \left[e^{-jkd_{m,n}}\right]_{M\times N},$$

$$H_{NLoS} \sim CN(0, \sigma^2 I)$$

Where $H_{LoS}$ is the line-of-sight component described by the geometry of the array, explained above, k=2π/λ is the wavenumber of the carrier, λ is the wavelength of the carrier, $H_{NLOS}$ represents the statistical behavior of scatterers modeled as independent and identically distributed complex Gaussian distributed matrix with mean zero and standard deviation equal to one ($H_{NLoS}$~CN(0, I), where I is the identity matrix), and K represents the Rice Factor of the channel, which is the power ratio between the LoS and non-line-of-sight (NLoS) components of the channel.

In this channel model, the elements are assumed to be isotropic but can have a radiation pattern. Nevertheless, $H_{NLoS}$ needs to be adjusted to compensate for the antenna pattern. Another assumption is that the distance between the transmitter and receiver arrays D is much larger than to the inter-antenna spacing d (D>>d), such that the path gain experienced in each antenna pair Tx-Rx is approximately the same, allowing normalization of the matrices and focus on a "phase" analysis.

Figure 5:
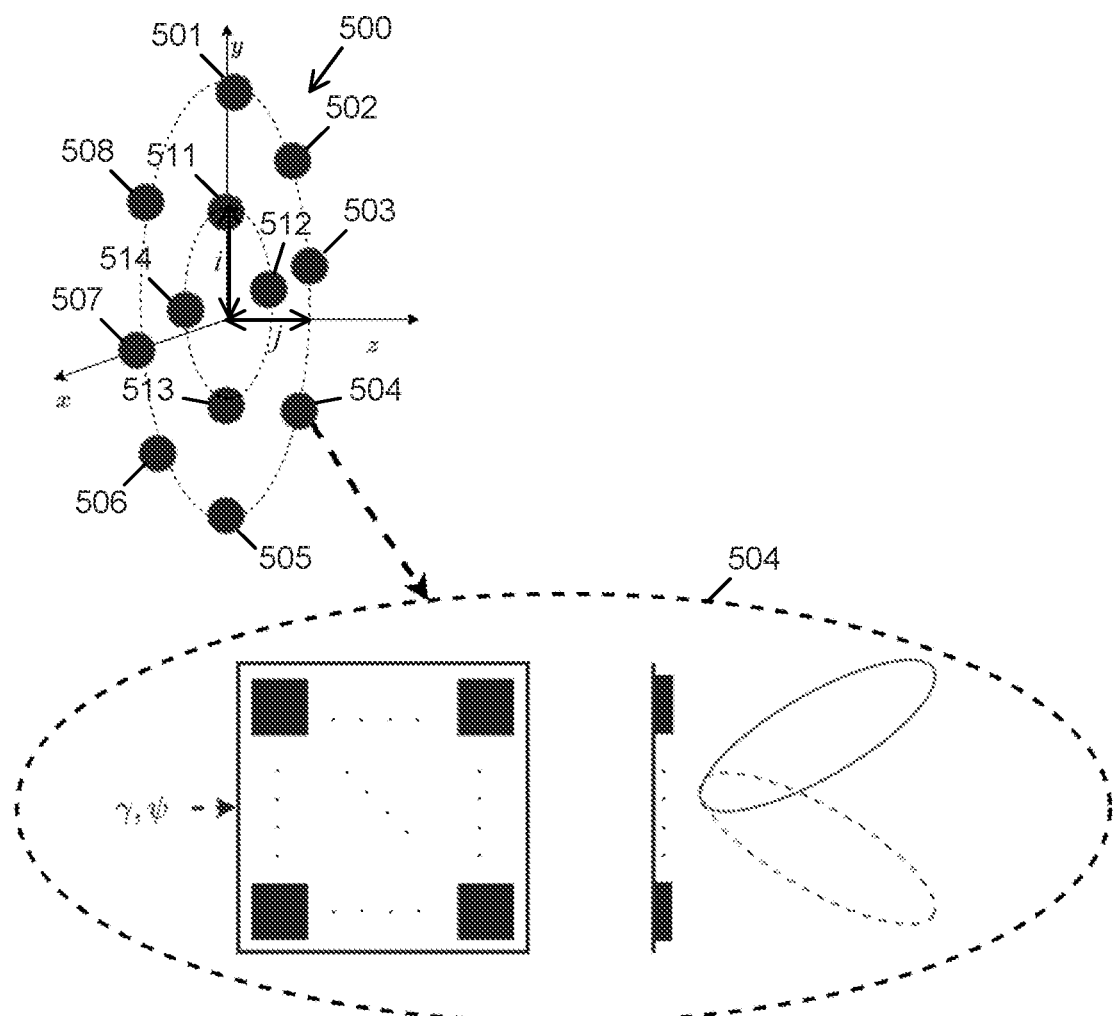
FIG. 5 depicts an example of a concentric circular array (CCA) with steerable miniaturized array elements.

FIG. 5 depicts an example of a concentric circular array (CCA) 500 with steerable miniaturized array elements. If the design requires more concentric arrays, multiple rings with different radii i, j (e.g., $R_t^i$, $R_r^j$) can be added as shown in FIG. 5. An outer ring includes o antennas 501, 502, 503, 504, 505, 506, 507, and 508 while an inner ring includes p antennas 511, 512, 513, and 514. Each antenna port may be connected to a miniaturized steerable antenna (e.g., as shown in the enlargement for antenna 504) or steerable antenna with lens to increase the antenna gain and improve flexibility in the deployment and connection.

Figure 6:
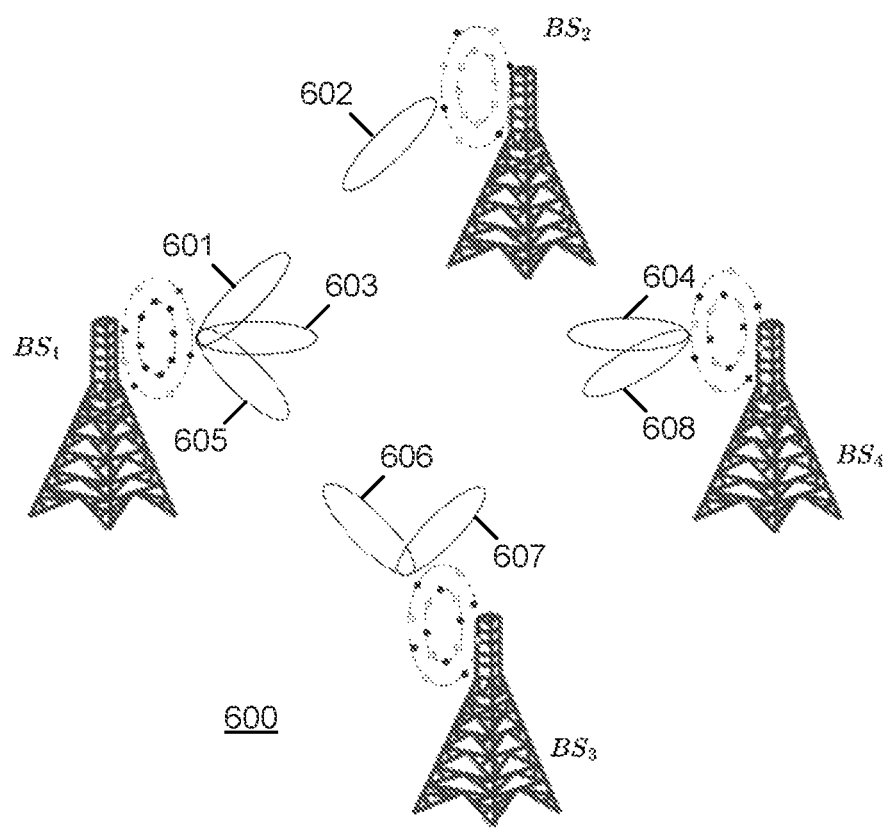
FIG. 6 illustrates an example of a CCA implementation on high-speed backhaul links with antenna subarray selection capabilities.

FIG. 6 illustrates an example of a CCA implementation 600 on high-speed backhaul links with antenna subarray selection capabilities, providing a backhaul link environment where the antennas of the present disclosure can be used to connect multiple base stations $BS_1$, $BS_2$, $BS_3$, and $BS_4$ with the help of the antenna/subarray selection and steerable beams in order to exploit the benefits of the uniform circular arrays. Base stations $BS_1$ and $BS_2$ communicate using beams 601 and 602; base stations $BS_1$ and $BS_2$ communicate using beams 603 and 604; base stations $BS_1$ and $BS_3$ communicate using beams 605 and 606; and base stations $BS_3$ and $BS_4$ communicate using beams 607 and 608. While illustrated as terrestrial base stations, the present disclosure can nevertheless be applied in other multi-user scenarios, such as: fixed wireless access; and mobile access scenarios (e.g., drones, high altitude platform systems (HAPS), etc.).

With the foregoing channel matrix, the capacity of the MIMO channel model can be computed by using "singular value decomposition" (SVD). By definition [7,8], any matrix H can be decomposed as follows:

$$H_{M\times N}=U_{M\times M}\Sigma_{M\times N}V_{N\times N}^\dagger \quad (5)$$

where U, V are unitary matrices, † indicates the conjugate transpose, and Σ=diag($\sigma_1, \sigma_2, \ldots, \sigma_P$) is a diagonal matrix with P elements, where $$P = \min(M, N)$$

and each element is the matrix Σ is ordered from the largest to the smallest (i.e., , $\sigma_1 \geq \sigma_2 \geq \ldots \geq \sigma_{R_H} > \sigma_{r+1} = \sigma_P = 0$) (that is, a diagonal matrix of the highest eigenvalues), and where $R_H$=rank(H) is the rank of the matrix H.

To compute the capacity, use is made of the work from Shannon [9], Winters [10], and Foschini [11], who stated that the capacity C in a MIMO channel is computed as:

$$C = \max_{Rx:Tr(Rx)=\rho} B \log_2(\det(I_M + HR_xH^\dagger)) \quad (6)$$

$$= \begin{cases} C_{Water} = \max_{P_i:\Sigma_i P_i \leq P} B\sum_{i=1}^{R_H} \log_2\left(1+\frac{P_i}{P}\gamma_i\right) \\ C_{EPA} = B\sum_{i=1}^{R_H} \log_2\left(1+\frac{\gamma_i}{N}\right) \end{cases}$$

where B is the bandwidth, $I_M$ is the identity matrix of size M, and $R_x$ is the receiver matrix. If the channel is known by the transmitter, then the power $$\left(\frac{P_i}{P}\right)$$

is allocated by the water-filling power allocation algorithm [8] ($C_{Water}$); otherwise the power $\rho$ on each eigenmode ($R_x=I_N$) is equally distributed and the capacity will be $C_{EPA}$.

Without loss of generality, the number of antennas on both link ends may be assumed to be the same (i.e., N). In [12], the uniform circular array channel matrix is analyzed. Based on the "circulant" property of the matrix and the use of IFFT/FFT precoding a full diagonalization is possible without SVD (i.e. channel state information).

An application of this property is observed in [13], where the authors proposed treating an uniform planar array as an uniform concentric circular (UCCA). The reason behind such treatment is to use the intrinsic properties of a LoS MIMO channel for a uniform circular array (UCA), described in [12].

A UCA LoS MIMO channel in perfect alignment is a circulant matrix, and it can be represented as:

$$H_{MIMO}=F^\dagger \Delta F \rightarrow H_{IFFT-FFT}=FH_{MIMO}F^\dagger \rightarrow$$
$$H_{IFFT-FFT}=\Delta \qquad (7)$$

$$\Delta = \text{diag}(\lambda_1, \lambda_2, \ldots, \lambda_N), \lambda_n = \left|\frac{\beta_0}{4\pi}\sum_{m=1}^{N}\frac{e^{-jkr_{m,1}}}{r_{m,1}}e^{\frac{-j2\pi nm}{N}}\right|$$

where F is a DFT matrix. [2] In other words, a DFT precoding can be used in a LoS MIMO system, where the complexity is $CC_{IFFT-FFT}=2N$, as an alternative to SVD precoding for a low complexity MIMO design.

The works in [12]-[13] open the door for the analysis and design of optimal arrays that maximize the capacity using the intrinsic property of UCA. The present disclosure addresses the optimal design of concentric circular arrays that optimally uses the space while increasing the maximum achievable spectral efficiency.

$$H_{CCA} = \begin{bmatrix} H_{1,1} & \cdots & H_{1,N_C} \\ \vdots & \ddots & \vdots \\ H_{N_C,1} & \cdots & H_{N_C,N_C} \end{bmatrix} \qquad (8)$$

By having concentric circular arrays (see $H_{CCA}$ in Eq. 8) symmetry of the channel matrix (under perfect alignment) is ensured, and each subarray channel matrix is configured to be circulant, allowing a low-complexity design of transmitters and receivers while maximizing the capacity with the help of DFT precoding and beam steering capabilities.

The present disclosure will focus/emphasize capacity maximization for LoS MIMO scenarios, which differs from the antenna pattern approach described in the literature. Merging the aforementioned concepts of concentric circular arrays with the capacity computation will allow determination of the optimal number of rings ($R_i$), angular offsets and antenna elements per circular array ($\hat{N}_k$, $\hat{R}_k$). The ring radius will have a limit $R^{max}$ determined by area limitations. This optimization can be described as follows (see FIG. 10 for block diagram of algorithm):

$$[\hat{N}_k, \hat{R}_k, \hat{\vartheta}_k] = \max_{\substack{R_k, \vartheta_k \\ R_k \leq R^{max}, \vartheta_k \in [0,\frac{2\pi}{N_k}], \Sigma_i P_i \leq P}} \sum_{i=1}^{R_{H_{CCA}}} \log_2\left(1 + \frac{P_i}{P}\gamma_i\right), \qquad (9)$$

$$\lambda_i = \frac{\sigma_i^2 P}{\sigma_n^2}$$

In other words, instead of dealing with the full matrix, focus instead can be on each "circulant" sub-array, allowing a more tractable optimization. A way to simplify the optimization is by (instead of optimizing the ports as in Eq. 9) assigning equal power to all ports:

$$[\hat{N}_k, \hat{R}_k, \hat{\vartheta}_k] = \max_{\substack{R_k, \vartheta_k \\ R_k \leq R^{max}, \vartheta_k \in [0,\frac{2\pi}{N_k}]}} \sum_{i=1}^{R_{H_{CCA}}} \log_2\left(1 + \frac{\gamma_i}{N}\right) \qquad (10)$$

These parameters ($\hat{N}_k$, $\hat{R}_k$, $\hat{\vartheta}_k$) will be obtained using exhaustive search strategies and setting the corresponding constraints in area, carrier frequency, and range of operation as explained in connection with the block diagram described in FIG. 10.

Figure 7:
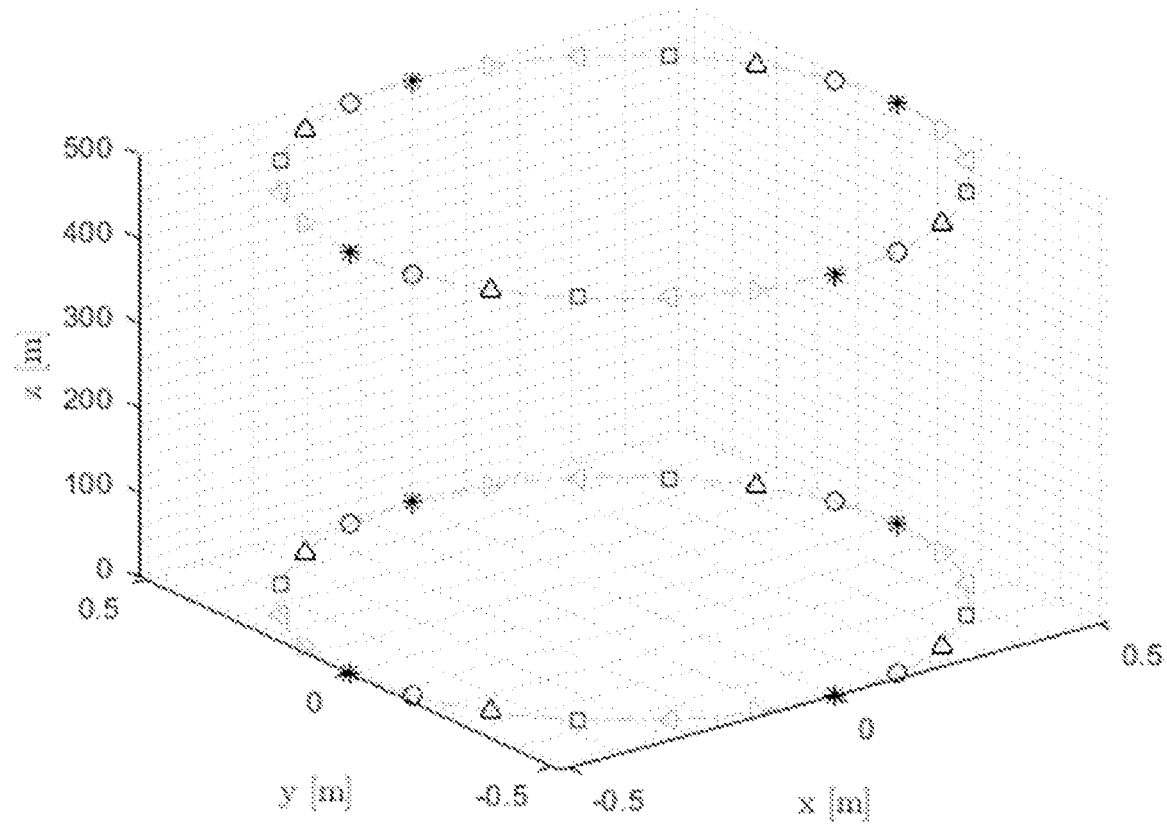
FIG. 7 illustrates an example of a uniform circular array (UCA)
Figure 8:
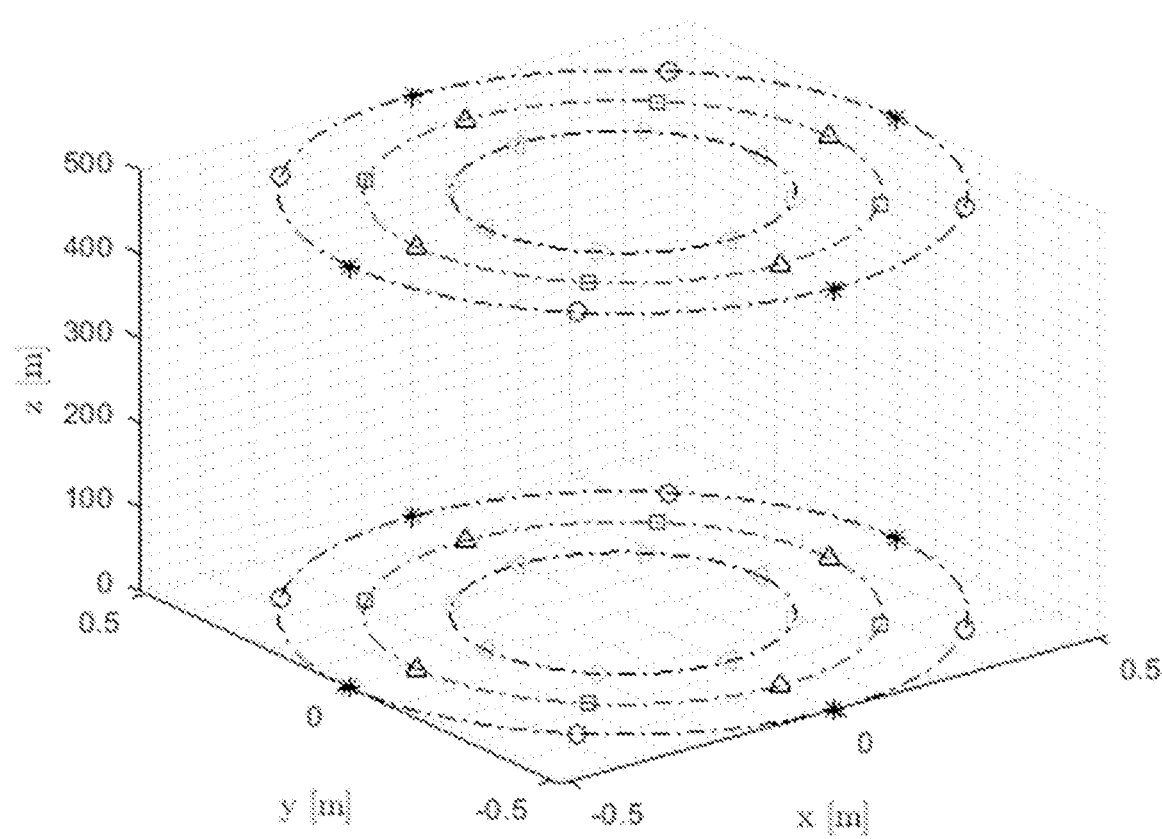
FIG. 8 illustrates an example of a uniform concentric circular array (UCCA)
Figure 9:
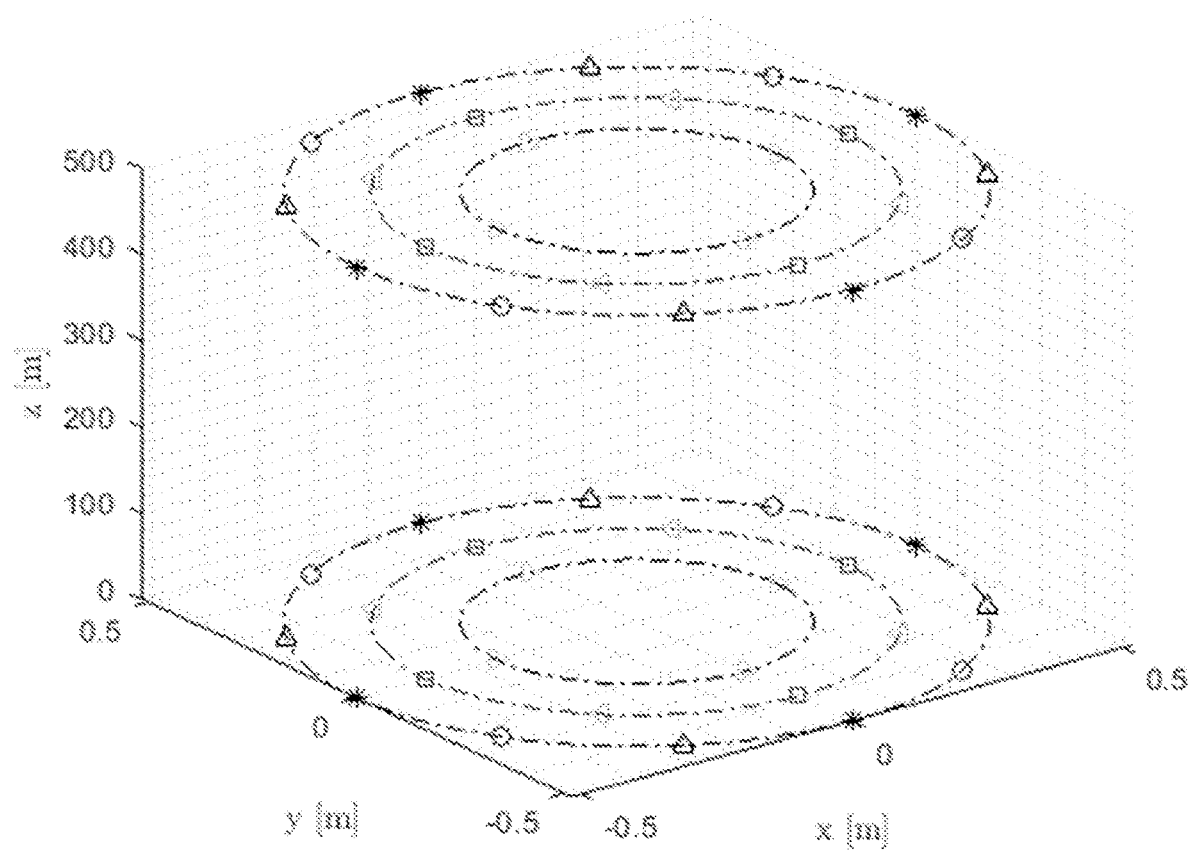
FIG. 9 illustrates an example of a non-uniform concentric circular array (NUCCA)

Some examples of array geometry are shown in FIGS. 7, 8, and 9, where all cases have the same number of antenna ports but different number of rings, arrays per ring, and offsets. FIG. 7 illustrates an example of a uniform circular array (UCA). FIG. 8 illustrates an example of a uniform concentric circular array (UCCA). FIG. 9 illustrates an example of a non-uniform concentric circular array (NUCCA). The UCCA and NUCCA configurations differ in whether the angular offset for antennas on different rings is the same or different.

Figure 10:
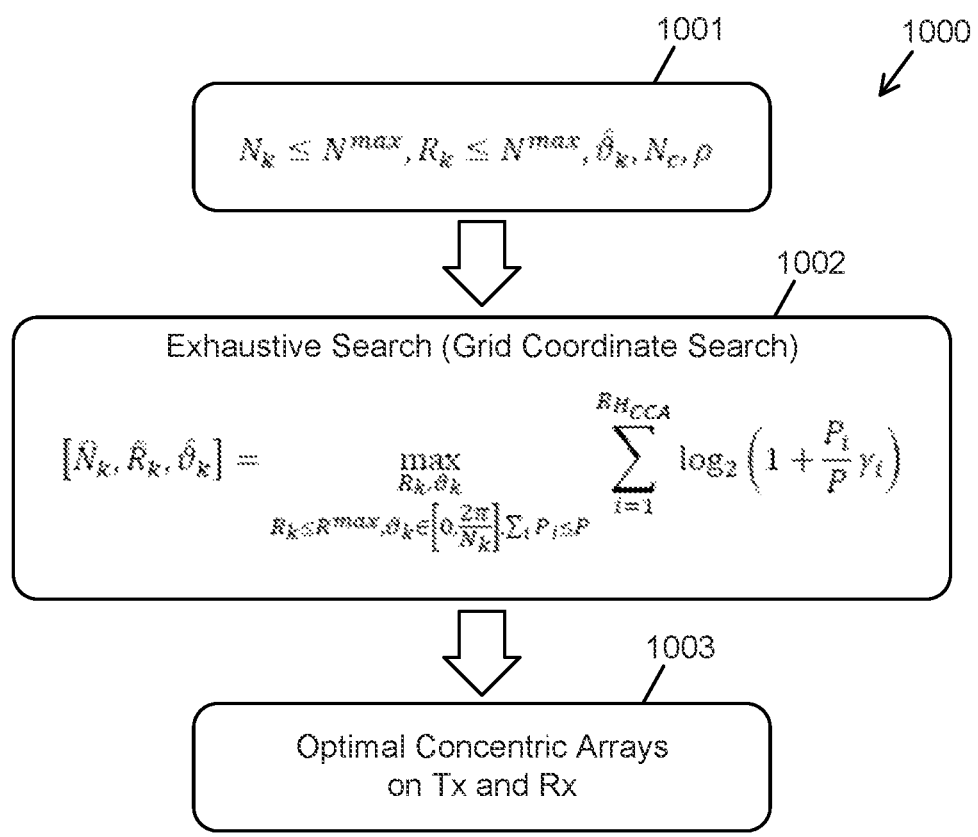
FIG. 10 is a high level flow diagram for CCA optimization according to embodiments of the present disclosure.

FIG. 10 is a high level flow diagram for CCA optimization according to embodiments of the present disclosure. The embodiment shown in FIG. 10 is for illustration only. Other embodiments of could be used without departing from the scope of this disclosure.

The process 1000 uses exhaustive search to find the optimal circular array design for finding a number of ports per array ($N_k \leq N^{max}$), with radius ($R_k \leq R^{max}$), finding the offsets between the ports ($\vartheta_k$), and finding the number of arrays per antenna ($N_c$), for a given SNR ($\rho$) and for a given area. The search parameters are defined (step 1001), and an exhaustive (grid coordinate) search is conducted using Eq. 9 (step 1002). The search produces optimal concentric arrays for the transmitter and receiver (step 1003).

To compare the capacity of each array geometry, the following parameters may be set:

$R_{Tx}=R_{Rx}=R$ $K_{dB}=+\infty$ (i.e., LoS)

$N=4$ $N_c=6$ $f_c=140$ GHz $D=500$ m ($4\times4$ UCA subarray, external ring)

$$R = \sqrt{\frac{\lambda D}{2N\left(\sin\left(\frac{\pi}{N}\right)\right)^2}}, \quad (11)$$

$$d_{LoS} = \left[0.62\sqrt{\frac{8R^3}{\lambda}}, \frac{16R^2}{\lambda}\right] [m]$$

For optimizing the circular array configuration, the radius for rings is a function of a single value for R. The number of antenna rings is up to N=4 and the distance D between the transmitter antenna array and the receiver antenna array is less than 500 meters (m), assuming a 4×4 UCA subarray for each antenna on the outermost ring; Rician factor $K_{dB}$=+∞ (i.e., LoS); the number of arrays per antenna ring is $N_c$=6 for N=4 antenna rings (that is, 24 antenna ports); a center frequency $f_c$=140 giga-Hertz (GHz) is assumed, and a power loss $\bar{\rho}$=30 decibels (dB). Line-of-sight Euclidean distance $d_{Los}$ is calculated as shown above. In an exemplary embodiment, the arrays are assumed to be separated by 500 meters and each array is defined as having 24 antenna ports arranged according to one of the following circular array configurations:

UCA:
  1 ring: [R, 24] (FIG. 7)
UCCA:
  6 rings: [R, 4]; [9R/10,4]; [4R/5,4]; [7R/10,4]; [3R/5, 4]; [R/2,4]
  3 rings: [R, 8]; [3R/4,8]; [R/2,8] (FIG. 8)
  2 rings: [R, 12]; [R/2,12]
NUCCA:
  3 rings: [R, 12]; [3R/4,8]; [R/2,4] (FIG. 9)

Capacity C according to Eq. 6 is determined for each of the above five circular array configurations, for both the transmitter and receiver antenna, for various values of R and distances D up to 500 m.

Figure 11:
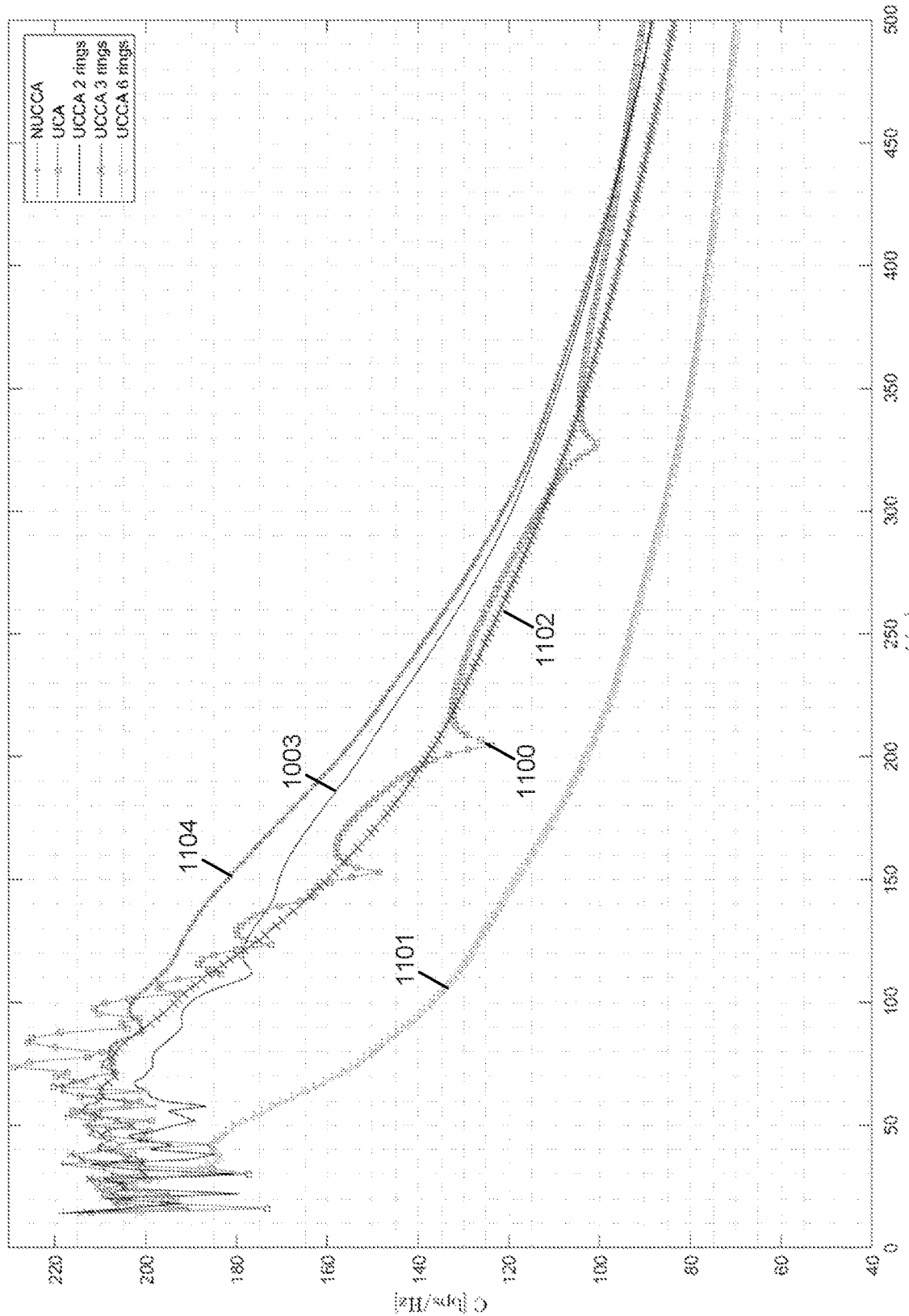
FIG. 11 illustrates a plot comparing capacity as a function of distance.

FIG. 11 illustrates a plot comparing capacity C, in bits-per-second per Hertz (bps/Hz) as a function of distance D, for each of the five different circular array configurations identified above: 1100 represents the plot for UCA (1 ring); 1101 represents the plot for UCCA with 6 rings; 1102 represents the plot for UCCA with 3 rings; 1103 represents the plot for UCCA with 2 rings; and 1104 represents the plot for NUCCA (3 rings).

As observed in FIG. 11, the worst geometry regarding capacity is the 6 ring case (1101), because the antenna elements were aligned between rings, increasing the interference and reducing the sum capacity. Increasing the number of antenna elements per ring improves the capacity because the increase reduces interference and so increases capacity for larger distances. The NUCCA arrangement with 3 rings (1104) ensures high capacity for larger distances compared to the rest of the geometries. All of the geometries show a rapid decay after 150 m. These results emphasize the importance of a proper design to guarantee a good spectral efficiency for long distance applications, while optimizing the array aperture (area), and reflect that for larger distances, NUCCA is often better that UCCA or UCA.

Figure 12:
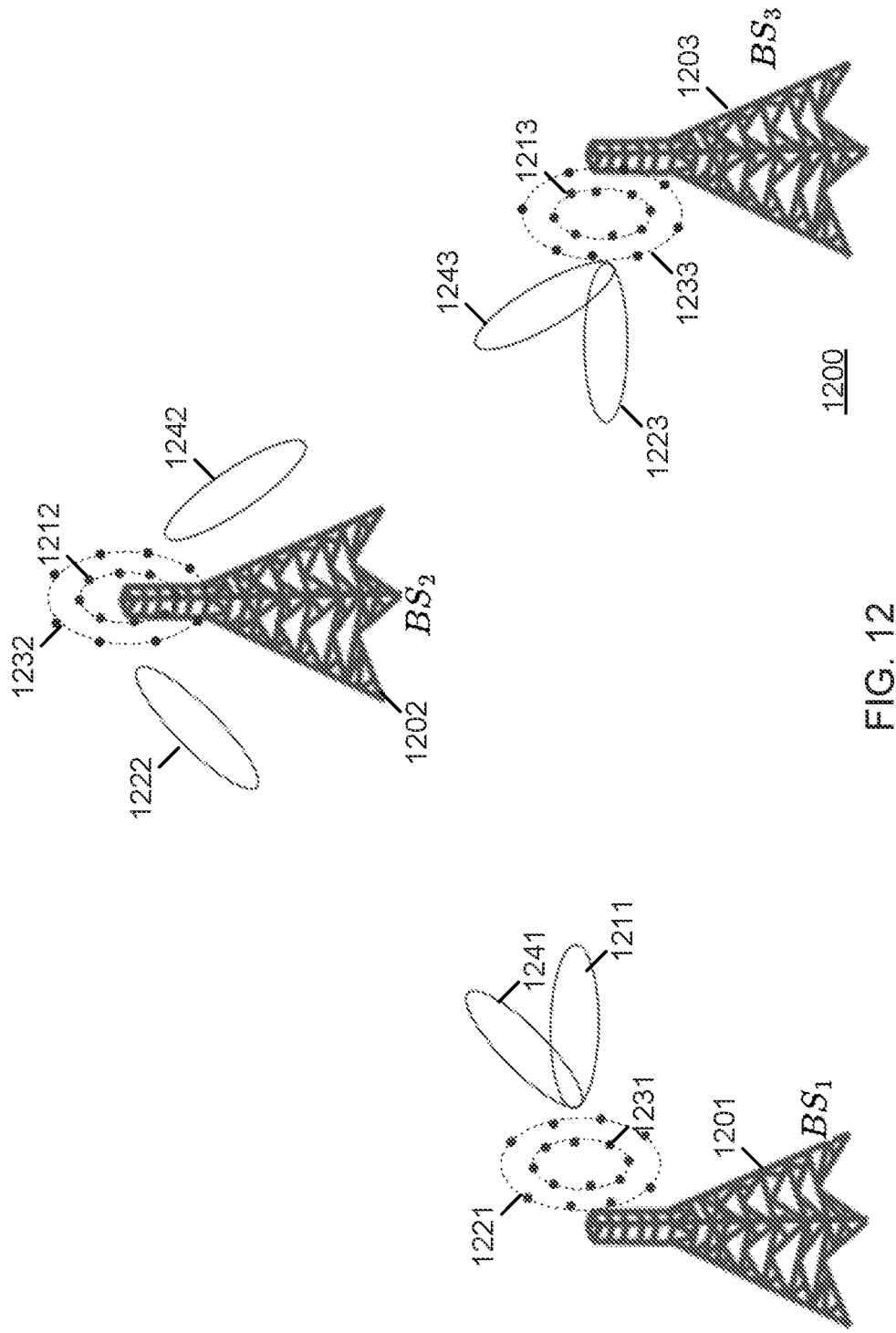
FIG. 12 illustrates the proposed antenna selection methodology using concentric array in backhaul networks.
Figure 13:
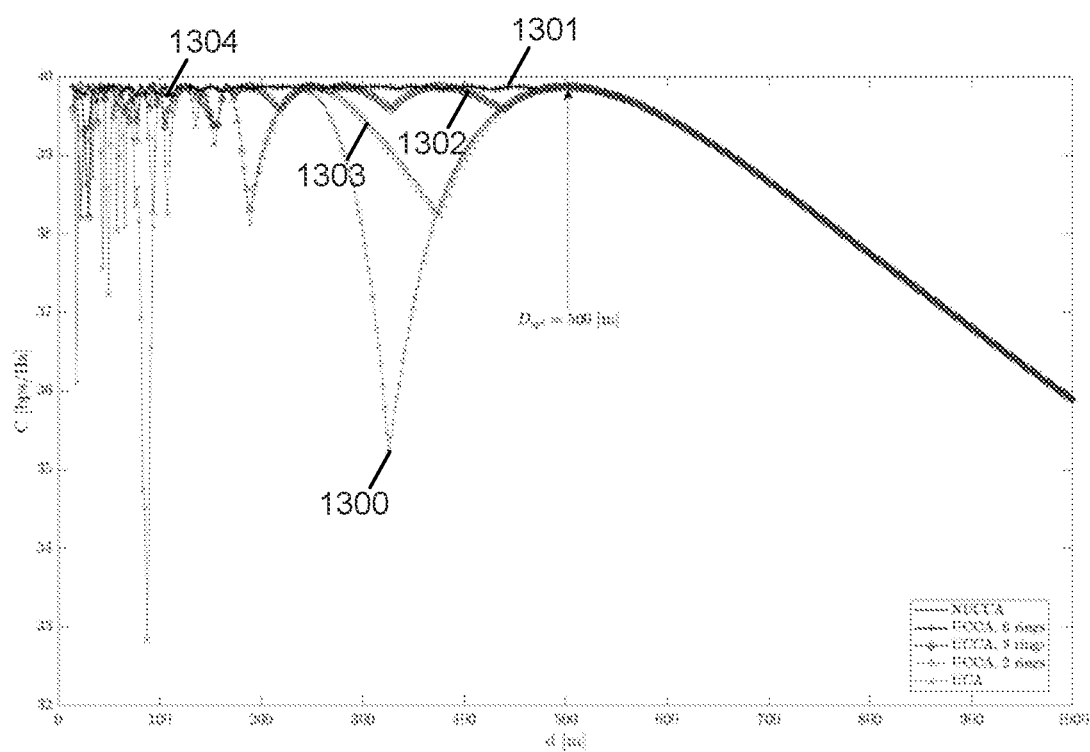
FIG. 13 is a comparison of capacity for antenna selection for each of the five different circular array configurations

Other example embodiments of the present disclosure include (but are not limited to):
  Antenna/subarray selection feature with beam steering to allow multi-user MIMO network capabilities (FIGS. 12-13 and the associated description).
  Addition of a beam steering network to assist the antenna array in directing the signal in multiple directions (multi-user or multiple base stations) (also FIGS. 12-13 and the associated description).
  Adding lenses to optimized circular antenna arrays to extend the range between the Tx and Rx.
  Study of mis-alignment or blockage between the Tx and Rx, and finding methods to correct the phases.
  Studying the optimal antenna design using different channel models (effects of reflections i.e., use of equalizers).

Antenna subarray selection is a strategy that selects the Tx-Rx concentric array that offers the highest capacity. In [14], an example of antenna subarray selection for UCAs is shown in which the Rx side has a switching network selecting the best receiving array. In the present disclosure the selection is performed in both sides, allowing more flexibility in the system, using:

$$(\hat{i}_k, \hat{j}_k) \max_{\substack{i_k, j_k \\ i_k \neq i_{k'} \wedge j_k \neq j_{k'} : k = k', \forall k}} \sum_{k=1}^{K} C_{i_k, j_k} \quad (12)$$

where $C_{i_k j_k}$ is the capacity for of the subarray channel matrix $H_{i,j}$ between the i-th Tx subarray and the j-th Rx subarray. The full channel matrix $H_{CCA}$=[$H_{i,j}$] for i, j∈ {1, . . . , $N_c$}, where $N_c$ is the number of concentric arrays.

Eq. 12 indicates that the antenna subarray selection is performed by selecting the K "non-overlapping" subarray combinations that maximizes the capacity of the link.

For example, FIG. 12 illustrates the proposed antenna selection methodology using concentric array in backhaul networks 1200 for the case of K=1. As shown in the figure, base station 1201 uses the beam 1211 produced by the outer concentric array 1221 to communicate with base station 1203, which uses the beam 1223 produced by the inner concentric array 1213 of that base station 1203 for communication with base station 1201. Base station 1201 uses the beam 1241 produced by the inner subarray 1231 to communicate with base station 1202, which uses the beam 1222 produced by the inner subarray 1212 to communicate with base station 1201. Base station 1202 uses the beam 1242 produced by the outer subarray 1232 to communicate with base station 1203, which uses the beam 1243 produced by the outer subarray 1233 to communicate with base station 1202.

This strategy provides flexibility not only in backhaul links, but also in multi-user access. The selection property and the beamsteering capability of the panels provides seamless systems.

FIG. 13 is a comparison of capacity for antenna selection for the case of K=1, for each of the five different circular array configurations discussed above: 1300 represents the plot for UCA (1 ring); 1301 represents the plot for UCCA with 6 rings; 1302 represents the plot for UCCA with 3 rings; 1303 represents the plot for UCCA with 2 rings; and 1304 represents the plot for NUCCA (3 rings). As can be observed in FIG. 13, the best performance is given by the case (1301) with more rings—a result that is congruent with the findings in [14]—while the second best is the NUCCA (1304) due to the larger number of antenna ports in the outer circle. An array with a lower number of ports is more robust as compared to larger ones, as explained in [15].

This feature is not limited to select the best sub-array pair, but can also be extended in selecting the best K subarrays, expanding the achievable capacity per link and the unused subarrays can be used to connect to a different base station, as shown in FIGS. 6 and 13.

The subject matter of the present disclosure can be used in near field communication systems that include, but are not limited to, wireless backhaul networks, multi-user access networks, and fixed wireless access. The disclosed subject matter can provide stability in the system as well as flexibility to switch between antenna arrays, to serve multiple users or base stations at the same time. This capability is a unique feature since not only is the optimal circular array design found for Tbps communications, but also several base stations and/or users may be served simultaneously.

For illustrative purposes the steps of algorithms above are described serially. However, some of these steps may be performed in parallel to each other. The operation diagrams illustrate example methods that can be implemented in accordance with the principles of the present disclosure and various changes could be made to the methods illustrated in the flowcharts. For example, while shown as a series of steps, various steps in each figure could overlap, occur in parallel, occur in a different order, or occur multiple times. In another example, steps may be omitted or replaced by other steps.

Although this disclosure has been described with an exemplary embodiment, various changes and modifications may be suggested to one skilled in the art. It is intended that this disclosure encompass such changes and modifications as fall within the scope of the claims.

What is claimed is:

1. A method for configuration of a line of sight, multiple input, multiple output circular array, the method comprising:
   setting an integer number of antenna arrays up to a number of antenna ports for the circular array and a maximum radius for any antenna ring within the circular array;
   determining a capacity for each of a plurality of different combinations of each of:
      an integer number of antenna rings up to a predetermined maximum number of antenna rings,
      a number of the antenna arrays for each of the number of antenna rings, and
      angular offsets for that antenna arrays on each of the antenna rings; and
   comparing the determined capacities for the plurality of different combinations.

2. The method of claim 1, wherein the plurality of different combinations includes at least one uniform circular array (UCA) configuration, at least one uniform concentric circular array (UCCA) configuration, and at least one non-uniform concentric circular array (NUCCA) configuration.

3. The method of claim 1, wherein the capacity for each of the plurality of different combinations is determined for a specified signal-to-noise ratio and a specified area.

4. The method of claim 1, wherein the capacity for each of the plurality of different combinations is determined for a specified carrier frequency and a specified distance between a transmitter and a receiver using the antenna ports.

5. The method of claim 1, wherein the capacity for each of the plurality of different combinations is determined for a same circular array configuration used by both a transmitter and a receiver.

6. The method of claim 1, wherein the plurality of different combinations each correspond to a circulant channel matrix.

7. The method of claim 1, wherein the capacity for each of the plurality of different combinations is determined based on equal power being allocated to all ports for the antenna arrays.

8. The method of claim 1, wherein the antenna arrays are selected to be non-overlapping.

9. The method of claim 1, wherein the capacity for each of the plurality of different combinations is determined for an antenna subarray selection between two specific base stations.

10. The method of claim 1, wherein the capacity for each of the plurality of different combinations is determined for antenna rings at a transmitter and at a receiver are at a same radius.

11. An apparatus for configuration of a line of sight, multiple input, multiple output circular array, the apparatus comprising:
    a processor configured to
       set an integer number of antenna arrays up to a number of antenna ports for the circular array and a maximum radius for any antenna ring within the circular array,
       determine a capacity for each of a plurality of different combinations of each of:
          an integer number of antenna rings up to a predetermined maximum number of antenna rings,
          a number of the antenna arrays for each of the number of antenna rings, and
          angular offsets for that antenna arrays on each of the antenna rings; and
       compare the determined capacities for the plurality of different combinations.

12. The apparatus of claim 11, wherein the plurality of different combinations includes at least one uniform circular array (UCA) configuration, at least one uniform concentric circular array (UCCA) configuration, and at least one non-uniform concentric circular array (NUCCA) configuration.

13. The apparatus of claim 11, wherein the capacity for each of the plurality of different combinations is determined for a specified signal-to-noise ratio and a specified area.

14. The apparatus of claim 11, wherein the capacity for each of the plurality of different combinations is determined for a specified carrier frequency and a specified distance between a transmitter and a receiver using the antenna ports.

15. The apparatus of claim 11, wherein the capacity for each of the plurality of different combinations is determined for a same circular array configuration used by both a transmitter and a receiver.

16. The apparatus of claim 11, wherein the plurality of different combinations each correspond to a circulant channel matrix.

17. The apparatus of claim 11, wherein the capacity for each of the plurality of different combinations is determined based on equal power being allocated to all ports for the antenna arrays.

18. The apparatus of claim 11, wherein the antenna arrays are selected to be non-overlapping.

19. The apparatus of claim 11, wherein the capacity for each of the plurality of different combinations is determined for an antenna subarray selection between two specific base stations.

20. The apparatus of claim 11, wherein the capacity for each of the plurality of different combinations is determined for antenna rings at a transmitter and at a receiver are at a same radius.

* * * * *